(12) United States Patent
Ikeda et al.

(10) Patent No.: US 9,005,865 B2
(45) Date of Patent: Apr. 14, 2015

(54) TONER

(71) Applicant: Canon Kabushiki Kaisha, Tokyo (JP)

(72) Inventors: Naotaka Ikeda, Kamakura (JP); Emi Watanabe, Suntou-gun (JP); Yuhei Terui, Numazu (JP); Taiji Katsura, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/180,708

(22) Filed: Feb. 14, 2014

(65) Prior Publication Data

US 2014/0162185 A1    Jun. 12, 2014

Related U.S. Application Data

(63) Continuation of application No. 13/288,653, filed on Nov. 3, 2011, now abandoned.

(30) Foreign Application Priority Data

Nov. 10, 2010    (JP) ................................ 2010-251905

(51) Int. Cl.
*G03G 5/00* (2006.01)
*G03G 9/08* (2006.01)
*B82Y 30/00* (2011.01)
*G03G 9/097* (2006.01)

(52) U.S. Cl.
CPC .............. *G03G 9/0812* (2013.01); *B82Y 30/00* (2013.01); *G03G 9/09716* (2013.01); *G03G 9/09725* (2013.01); *G03G 9/0819* (2013.01)

(58) Field of Classification Search
CPC .......................... G03G 9/0812; G03G 9/0808
USPC ........................................ 430/123.51, 137.1
See application file for complete search history.

(56) References Cited

U.S. PATENT DOCUMENTS

2002/0115008 A1*  8/2002  Suzuki et al. .............. 430/108.7

FOREIGN PATENT DOCUMENTS

JP          2007-099582        *   4/2007

OTHER PUBLICATIONS

Machine translation of JP2007-09952.*

* cited by examiner

*Primary Examiner* — Thorl Chea
(74) *Attorney, Agent, or Firm* — Canon U.S.A. Inc., IP Division

(57) ABSTRACT

A toner containing toner particles, each of which contains a binder resin and a colorant, and silica particles, wherein the silica particles have a volume average particle diameter (Dv) of 70 nm or more and 500 nm or less, the variation coefficient of diameters of the silica particles, based on volume distribution thereof, is 23% or less, and wherein when the silica particles are heated from 105° C. to 200° C., the ratio of mass decrease is 0.60% or less.

3 Claims, No Drawings

TONER

CROSS REFERENCE TO RELATED APPLICATIONS

This application is a Continuation of U.S. patent application Ser. No. 13/288,653 filed Nov. 3, 2011, which claims priority to Japanese Patent Application No. 2010-251905 filed Nov. 10, 2010, both of which are hereby incorporated by reference herein in their entireties.

BACKGROUND OF THE INVENTION

1. Field of the Invention

The present invention relates to a toner for developing an electrostatic image used for image forming of an electrophotographic system typified by a copying machine and a printer.

2. Description of the Related Art

Addition of an external additive having a large particle diameter has been proposed as a technique to improve the transferability of a toner (refer to Japanese Patent Laid-Open No. 2007-171666). This proposal is directed to improve the transferability by adding silica particles having large particle diameters to toner particles and reducing physical adhesion between the toner and a photo conductor. However, the silica particles, which are used in this proposal and which have large particle diameters, are particles obtained by a deflagration method and, therefore, have a wide particle size distribution. Consequently, in the case where the toner is used over a long term, particles having large particle diameters are eliminated from the toner easily, and particles having small particle diameters are embedded in toner particles easily. Furthermore, when silica particles move to concave portions of toner particle surfaces, it is difficult to give stable chargeability, fluidity, and transferability to the toner.

As for a technique to improve this harmful effect, addition of silica particles having large particle diameters with a narrow particle size distribution to toner particles has been proposed (refer to Japanese Patent Laid-Open No. 2007-322919). Japanese Patent Laid-Open No. 2007-322919 discloses that silica particles which have large particle diameters with a sharp particle size distribution and which are produced by a sol-gel method are used, so as to improve long-term stable chargeability and improve transferability. However, silica particles, which have large particle diameters and which are obtained by the sol-gel method, in the related art are hydrophilic particles having silanol groups to a large extent. Therefore, even when a hydrophobizing treatment is performed, there are large amounts of remaining silanol groups. Consequently, the property of the silica particles to give the chargeability to the toner is influenced by the temperature and the humidity easily, and it is difficult to give stable chargeability to the toner. Meanwhile, in the case where large amounts of hydrophobizing agent is used for silica particles in order to improve this harmful effect, a property to give fluidity to the toner is degraded. Consequently, in the case where a toner including such silica particles is used and images are output over a long term, it is difficult to maintain high image quality.

As for a technique to improve these harmful effects, use of silica particles, which have silanol groups to a relatively small extent and which have large particle diameters with a specific particle size distribution, to a toner has been proposed (refer to Japanese Patent Laid-Open No. 2008-262171). However, silica particles, which have large particle diameters and which are used in Japanese Patent Laid-Open No. 2008-262171, have a wide particle size distribution and there are problems in properties to give the fluidity and the chargeability to a toner.

As described above, it is difficult to obtain silica particles which have large particle diameters and which can give stable chargeability and fluidity to a toner regardless of environment.

SUMMARY OF THE INVENTION

The present invention provides a toner having stable chargeability and fluidity regardless of environment. Furthermore, the present invention provides a toner which can produce a high-definition high-quality image over a long term stably in the case where the toner is used for image forming.

The present invention relates to a toner containing toner particles, each of which contains a binder resin and a colorant, and silica particles, wherein the above described silica particles have a volume average particle diameter (Dv) of 70 nm or more and 500 nm or less, the variation coefficient of diameters of the silica particles, based on volume distribution thereof, is 23% or less, and wherein when heating the silica particles to measure the mass variation, the ratio of mass decrease of the silica particles at the temperature in the range of 105° C. to 200° C. is 0.60% or less.

The toner according to the present invention has stable chargeability and fluidity regardless of environment. Furthermore, in the case where the toner according to the present invention is used for image forming, a high-definition high-quality image can be produced over a long term stably.

Further features of the present invention will become apparent from the following description of exemplary embodiments.

DESCRIPTION OF THE EMBODIMENTS

The present inventors performed intensive research on the properties of silica particles having large particle diameters with respect to a toner, to which silica particles having large particle diameters are added externally. As a result, it was found that the above described problems were able to be solved by adding the silica particles, which have large particle diameters and having the following properties, to the toner externally.

The silica particles used in the present invention are silica particles having large particle diameters and having a volume average particle diameter (Dv) of 70 nm or more and 500 nm or less. In the case where the volume average particle diameter is more than 500 nm, the fluidity of the toner is hindered and, in addition, silica particles are eliminated from the toner surface easily. Therefore, such silica particles cannot give long-term stable chargeability and fluidity to the toner. Furthermore, eliminated silica particles adhere to developing agent constituent materials and image forming system members or contaminate them. Consequently, degradation in charge characteristics and an occurrence of toner scattering may be caused. On the other hand, in the case where the volume average particle diameter of the silica particles is less than 70 nm, a sufficient spacer effect of silica particles having large particle diameters is not exerted. Therefore, in the case where such silica particles are used for the toner, degradation of the toner transferability and degradation of the toner surface may occur. The volume average particle diameter (Dv) of the silica particles is preferably 80 nm or more and 200 nm or less.

The variation coefficient of diameters of the silica particles, based on volume distribution thereof, is 23% or less. In the case where the variation coefficient of diameters of the silica particles, based on volume distribution thereof, is within the above described range, the silica particles exert a spacer effect on the toner surface more effectively. As a result, the toner transferability is improved. Furthermore, a toner having long-term stable chargeability and fluidity is obtained. In the case where the variation coefficient of diameters of the silica particles is more than 23%, there are large variations in volume distribution of diameters of the silica particles. Consequently, even when the volume average particle diameter (Dv) of the silica particles is within the above described range, the proportion of particles which do not function as spacer particles is large and the toner transferability is not obtained sufficiently. Moreover, there are differences in properties to give the chargeability and the fluidity to a toner among individual silica particles. Consequently, the charge distribution of the toner is extended, so that in the case where such a toner is used for image forming, fogging or the like occur easily. The variation coefficient of diameters of the silica particles, based on volume distribution thereof, is preferably 15% or less, and further preferably 10% or less.

Measurements of volume average particle diameter (Dv) of silica particles and variation coefficient of diameters of silica particles, based on volume distribution thereof.

Measurements of the volume average particle diameter (Dv) of silica particles and the variation coefficient of diameters of silica particles, based on volume distribution thereof, are performed by using Zetasizer Nano ZS (produced by SYSMEX CORPORATION). The variation coefficient is determined in a manner as described below. Initially, the volume distribution of the particle size is measured, so as to determine the half-width of the volume distribution thereof and the volume average particle diameter (Dv). Subsequently, the ratio (%) of the half-width to the volume average particle diameter is calculated and, thereby the variation coefficient is determined.

Sample preparation and the measurement condition are as described below. About 1 mg of silica particles are added to 20 ml of pure water, and dispersion is performed for 3 minutes by using Homogenizer (produced by SMT). In order to reduce an influence of aggregation of silica particles, the volume average particle diameter (Dv) and the variation coefficient are measured just after the dispersion under the following condition.

Measurement Condition
Cell: DTS0012-Disposable sizing cuvette
Dispersant: Water
Refractive index:
material: 1.460
dispersant: 1.330
Temperature: 25° C.
Measurement duration:
Number of runs: 5
Runs duration (Seconds): 10
Result Calculation General Purpose Regarding the silica particles used in the present invention, when heating the silica particles to measure the mass variation, the ratio of mass decrease at the temperature in the range of 105° C. to 200° C. (hereafter may be simply referred to as ratio of mass decrease) is 0.60% or less. The ratio of mass decrease refers to the percentage of mass decrease of silica particles in the range of 105° C. to 200° C. when a thermogravimetric analyzer (TGA) is used and the silica particles are heated from 50° C. to 500° C. at normal pressure. When the silica particles are heated, silanol groups of the silica particles are dehydrated and condensed at about 130° C. and, thereby, the mass of silica particles decreases. Meanwhile, water (not derived from the silanol group), volatile substances, and the like adhering to the silica particles are almost volatilized at normal pressure at about 105° C. Hexamethyldisilazane (HMDS), silicone oil, and the like, which are used as agents for treating silica, begin to volatilize at normal pressure at a temperature higher than 200° C. (about 250° C.). Consequently, the present inventors believe that the amount of silanol groups included in the silica particles is quantified by measuring the ratio of mass decrease of silica particles in the range of 105° C. to 200° C.

The silanol groups of the silica particles are water-adsorption sites and, therefore, the amount of silanol groups in the silica particles exerts a large effect on the hygroscopicity of the silica particles. Consequently, the amount of silanol groups included in the silica particles exerts a large effect on the properties to give the chargeability, the fluidity, and the transferability to the toner. In the case where the ratio of mass decrease of the silica particles is more than 0.60%, the amount of silanol groups in the silica particles is large. As a result, in particular under a high-humidity environment, silica particles adsorb a large amount of water, so that the toner is not provided with the chargeability and the fluidity sufficiently. The ratio of mass decrease of the silica particles is preferably 0.10% or less, and further preferably 0.02% or less.

Method for Measuring Ratio of Mass Decrease of Silica Particles

The ratio of mass decrease of silica particles is measured by using Hi-Res TGA 2950 Thermogravimetric Analyzer (produced by TA Instrument). About 0.03 g of silica particles serving as a sample are added to a pan for the above described analyzer, and the resulting pan is set into the analyzer. At that time, in consideration of the bulkiness of silica particles, the amount of sample is adjusted appropriately. After an equilibrium state is reached at normal pressure at 50° C., that state is held for 10 minutes, and the mass of the silica particles is measured. Subsequently, a nitrogen gas is supplied, the temperature is raised to 500° C. at 20° C./min at normal pressure, and the mass variation is measured. Then, the percentage of the amount of mass decrease of the silica particles in the range from 105° C. to 200° C. relative to the mass of the silica particles after being held at 50° C. for 10 minutes is taken as the ratio of mass decrease.

The silica particles used in the present invention have a small ratio of mass decrease of 0.60% or less and, therefore, the hygroscopicity is very small as compared with that of the large-diameter silica particles obtained by a sol-gel method in the related art. Consequently, the surfaces thereof are not necessarily subjected to a hydrophobizing treatment in contrast to the large-diameter silica particles obtained by the sol-gel method in the related art. However, in order to give long-term stable chargeability, fluidity, and transferability to the toner, the silica particles used in the present invention may be subjected to the hydrophobizing treatment.

The method for subjecting the silica particles to the hydrophobizing treatment is not specifically limited, and known methods may be used. Examples of methods for subjecting the silica particles to the hydrophobizing treatment include a method in which the silica particles are treated with a hydrophobizing agent in a dry condition and a method in which the silica particles are treated with a hydrophobizing agent in a wet condition.

Most of all, the dry hydrophobizing treatment method can be employed because the toner is provided with excellent fluidity while aggregation of the silica particles is prevented. Examples of dry hydrophobizing treatment methods include a method in which the silica particles are treated by spraying of a hydrophobizing agent under agitation and a method in which a vapor of hydrophobizing agent is introduced to the silica particles in a fluidized bed or under agitation.

Examples of hydrophobizing agents include the following: chlorosilanes, e.g., methyltrichlorosilane, dimethyldichlorosilane, trimethylchlorosilane, phenyltrichlorosilane, diphenyldichlorosilane, t-butyldimethylchlorosilane, and vinyltrichlorosilane; alkoxysilanes, e.g., tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, i-butyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, and γ-(2-aminoethyl)aminopropylmethyldimethoxysilane; silazanes, e.g., hexamethyldisilazane, hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, and dimethyltetravinyldisilazane; silicone oils, e.g., dimethyl silicone oil, methylhydrogen silicone oil, methylphenyl silicone oil, alkyl-modified silicone oil, chloroalkyl-modified silicone oil, chlorophenyl-modified silicone oil, fatty acid-modified silicone oil, polyether-modified silicone oil, alkoxy-modified silicone oil, carbinol-modified silicone oil, amino-modified silicone oil, fluorine-modified silicone oil, and terminally-reactive silicone oil; siloxanes, e.g., hexamethylcyclotrisiloxane, octamethylcyclotetrasiloxane, decamethylcyclopentasiloxane, hexamethyldisiloxane, and octamethyltrisiloxane; long chain fatty acids, e.g., undecylic acid, lauric acid, tridecylic acid, dodecylic acid, myristic acid, palmitic acid, pentadecylic acid, stearic acid, heptadecylic acid, arachic acid, montanic acid, oleic acid, linoleic acid, and arachidonic acid; and salts of the above described fatty acids and metals, e.g., zinc, iron, magnesium, aluminum, calcium, sodium, and lithium. Among them, alkoxysilanes, silazanes, and straight silicone oils can be used because a hydrophobizing treatment is performed easily. Such hydrophobizing agents may be used alone or in combination. The above described hydrophobizing agents may be used stepwise sequentially to surface-treat silica particles.

In the case where the silica particles used in the present invention are subjected to the hydrophobizing treatment, the amount of carbon derived from a hydrophobizing agent in the silica particles is preferably 0.01% by mass or more and 4.5% by mass or less. In the case where the above described amount of carbon is within the above described range, the usage of the hydrophobizing agent is appropriate and degradation in fluidity of the silica particles is prevented. Meanwhile, as described above, the silica particles before being subjected to the hydrophobizing treatment have low hygroscopicity as compared with those in the related art. Therefore, in order to exert this effect sufficiently, the usage of the hydrophobizing agent is minimized. Consequently, good chargeability and fluidity of the toner is enhanced. The above described amount of carbon is further preferably 0.02% by mass or more and 1.0% by mass or less, and particularly preferably 0.03% by mass or more and 0.08% by mass or less.

Method for Measuring Amount of Carbon of Silica Particles

The amount of carbon of the silica particles is measured by using a carbon and sulfur analyzer (EMIA-320 produced by HORIBA, Ltd.). About 0.3 g of sample is precisely weighed into a crucible for the above described measurement apparatus, and 0.3 g±0.05 g of tin (Spare No. 9052012500) and 1.5 g±0.1 g of tungsten (Spare No. 9051104100) are added as fuel oil additives. Then, the silica particles are heated to 1,100° C. in an oxygen atmosphere following the description of the instruction manual attached to the measurement apparatus. Consequently, hydrophobic groups derived from the hydrophobizing agent on the silica particle surfaces are thermally decomposed to $CO_2$. Thereafter, the amount of carbon contained in the silica particles is determined from the amount of the resulting $CO_2$ and this is taken as the amount of carbon derived from the hydrophobizing agent.

Regarding the silica particles used in the present invention, the fixing ratio of the hydrophobizing agent to the silica particles is preferably 90% or more. In the case where the fixing ratio is within the above described range, the silica particles give good chargeability, fluidity, and transferability to the toner regardless of the environment.

Method for Measuring Fixing Ratio of Hydrophobizing Agent to Silica Particles

The fixing ratio of the hydrophobizing agent to the silica particles is measured by the following method. An Erlenmeyer flask is charged with 0.50 g of silica fine particles and 40 ml of chloroform and is covered with a lid, followed by agitation for 2 hours. Subsequently, agitation is stopped. Standing for 12 hours and centrifugal separation are performed and a supernatant liquid is removed completely. The centrifugal separation is performed with Centrifuge H-9R (produced by KOKUSAN) by using Bn1 rotor and a plastic centrifuge tube for Bn1 rotor under the condition of 20° C., 10,000 rpm, and 5 minutes.

The centrifugally separated silica particles are put into the Erlenmeyer flask again, 40 ml of chloroform is added, the lid is set, and agitation is performed for 2 hours. Subsequently, agitation is stopped. Standing for 12 hours and centrifugal separation are performed and a supernatant liquid is removed completely. This operation is further repeated two times. The resulting sample is dried by using a constant temperature bath at 50° C. for 2 hours. Furthermore, decompression to 0.07 MPa is performed, followed by drying at 50° C. for 24 hours, so as to volatilize chloroform sufficiently.

The amount of carbon of the silica particles treated with chloroform, as described above, and the amount of carbon of the silica particles before the treatment with chloroform are measured following the above described "Method for measuring amount of carbon of silica particles". The fixing ratio is calculated by using a formula described below.

fixing ratio of hydrophobizing agent to the silica particles (%)=(amount of carbon of silica particles treated with chloroform/amount of carbon of silica particles)×100

The method for producing the silica particles used in the present invention will be described below. The method for producing the silica particles used in the present invention is not specifically limited. Examples thereof include the following methods: a combustion method in which silica particles are obtained by combustion of a silane compound (that is, a method for producing fumed silica); a deflagration method in which silica particles are obtained by explosive combustion of a metal silicon powder; wet methods in which silica particles are obtained by a neutralization reaction between sodium silicate and a mineral acid (among them, synthesis under an alkaline condition is referred to as a sedimentation method, and synthesis under an acid condition is referred to as a gel method); and a sol-gel method in which silica particles are obtained by hydrolysis of alkoxysilanes, e.g., hydrocarbyloxysilane (a so-called Stoeber method). Among them, the sol-gel method can be employed as a method for producing large-diameter silica particles because a sharp particle size distribution of the silica particles is obtained as compared with the other methods.

The method for producing silica particles by the sol-gel method will be described below. Initially, in an organic solvent in which water is present, an alkoxysilane is subjected to hydrolysis and condensation reactions in the presence of a catalyst, so as to obtain a silica sol suspension liquid. The catalyst is removed from the silica sol suspension liquid, and drying is performed, so that silica particles are obtained. The silica particles obtained at this stage have silanol groups to a large extent and are hydrophilic. Therefore, the ratio of mass decrease takes on a value larger than 2%. In order to make the ratio of mass decrease of the silica particles obtained by the above described sol-gel method fall within the range specified in the present invention, the silica particles are heat-treated at 300° C. to 500° C. Consequently, the silanol groups of the silica particles are dehydrated and condensed, so that the amount of silanol groups is reduced and it is possible to reduce the value of the ratio of mass decrease of the silica particles.

In the case where the silica particles are treated with the hydrophobizing agent, the timing of the heat treatment at 300° C. to 500° C. may be before, after, or at the same time with the hydrophobizing treatment. However, in the case where the heat treatment is performed after the hydrophobizing treatment, the hydrophobizing agent is thermally decomposed, and the above described fixing ratio of the hydrophobizing agent may not be obtained. Therefore, the heat treatment can be performed before the hydrophobizing treatment.

Moreover, in order that the silica particles become monodisperse on the toner particle surface easily and a stable spacer effect is exerted, the silica particles can be subjected to a disintegration treatment after being heat-treated. Regarding the timing of the disintegration treatment, the disintegration treatment can be performed before the surface treatment is performed with the hydrophobizing agent because the silica particle surfaces can be uniformly treated with the hydrophobizing agent.

The amount of addition (amount of external addition) of the silica particles used in the present invention to the toner is preferably 0.01 parts by mass or more and 2.50 parts by mass or less relative to 100 parts by mass of the toner particles. In the case where the amount of addition of the silica particles is within the above described range, the above described effects of the silica particles are exerted favorably. The amount of addition of the silica particles to the toner is more preferably 0.10 parts by mass or more and 2.00 parts by mass or less relative to 100 parts by mass of toner particles.

The weight average particle diameter (D4) of the toner according to the present invention is preferably 4.0 μm or more and 9.0 μm or less, and more preferably 5.0 μm or more and 7.5 μm or less. In the case where the weight average particle diameter (D4) of the toner is within the above described range, an occurrence of charge up is suppressed and fogging, toner scattering, and reduction in image density are prevented.

Method for Measuring Weight Average Particle Diameter (D4) and Number Average Particle Diameter (D1)

The weight average particle diameter (D4) and the number average particle diameter (D1) of the toner are calculated in a manner described below. As for a measurement apparatus, a precise particle size distribution measurement apparatus "Coulter Counter Multisizer 3" (registered trademark, produced by Beckman Coulter, Inc.) equipped with a 100 μm aperture tube on the basis of a pore electrical resistance method is used. Regarding setting of the measurement conditions and analysis of the measurement data, an attached dedicated software "Beckman Coulter Multisizer 3 Version 3.51" (produced by Beckman Coulter, Inc.) is used. In this regard, the measurement is performed with the number of effective measurement channels of 25,000 channels. As for the electrolytic aqueous solution used for the measurement, a solution prepared by dissolving special grade sodium chloride into ion-exchanged water in such a way as to have a concentration of about 1% by mass, for example, "ISOTON II" (produced by Beckman Coulter, Inc.), may be used.

By the way, prior to the measurement and the analysis, the above-described dedicated software is set as described below. In the screen of "Modification of the standard operating method (SOM)" of the above-described dedicated software, the total count number in the control mode is set at 50,000 particles, the number of measurements is set at 1 time, and the Kd value is set at a value obtained by using "Standard particles 10.0 μm" (produced by Beckman Coulter, Inc.). The threshold value and the noise level are automatically set by pressing "Threshold value/noise level measurement button". In addition, the current is set at 1,600 μA, the gain is set at 2, the electrolytic solution is set at ISOTON II, and a check is entered in "Post-measurement aperture tube flush". In the screen of "Setting of conversion from pulses to particle diameter" of the above-described dedicated software, the bin interval is set at logarithmic particle diameter, the particle diameter bin is set at 256 particle diameter bins, and the particle diameter range is set at 2 μm to 60 μm.

The specific measurement procedure is as described below.
(1) A 250 ml round-bottom glass beaker dedicated to Multisizer 3 is charged with about 200 ml of the above-described electrolytic aqueous solution, the beaker is set in a sample stand, and counterclockwise agitation is performed with a stirrer rod at 24 revolutions/sec. Then, contamination and air bubbles in the aperture tube are removed by "Aperture flush" function of the dedicated software.
(2) A 100 ml flat-bottom glass beaker is charged with about 30 ml of the above-described electrolytic aqueous solution. A diluted solution is prepared by diluting "Contaminon N" (a 10% by mass aqueous solution of neutral detergent for washing a precision measuring device, including a nonionic surfactant, an anionic surfactant, and an organic builder and having a pH of 7, produced by Wako Pure Chemical Industries, Ltd.) with ion-exchanged water by a factor of about 3 on a mass basis and about 0.3 ml of the diluted solution serving as a dispersing agent is added to the inside of the beaker.
(3) An ultrasonic dispersing machine "Ultrasonic Dispersion System Tetora 150" (produced by Nikkaki Bios Co., Ltd.) is prepared, the system incorporating two oscillators with an oscillatory frequency of 50 kHz in such a way that the phases are displaced by 180 degrees and having an electrical output of 120 W. Then, about 3.3 l of ion-exchanged water is put into a water tank of the ultrasonic dispersion system, and about 2 ml of Contaminon N is added to the inside of this water tank.
(4) The beaker in the above-described item (2) is set in a beaker fixing hole of the above-described ultrasonic dispersion system, and the ultrasonic dispersion system is actuated.

The height position of the beaker is adjusted in such a way that the resonance state of the liquid surface of the electrolytic aqueous solution in the beaker is maximized.

(5) Ultrasonic waves are applied to the electrolytic aqueous solution in the beaker of the above-described item (4). In this state, about 10 mg of toner is added to the above-described electrolytic aqueous solution little by little and is dispersed. Subsequently, an ultrasonic dispersion treatment is further continued for 60 seconds. In this regard, in the ultrasonic dispersion, the water temperature of the water tank is controlled at 10° C. or higher and 40° C. or lower appropriately.

(6) The electrolytic aqueous solution, in which the toner is dispersed, of the above-described item (5) is dropped to the round-bottom beaker of the above-described item (1) set in the sample stand by using a pipette in such a way that the measurement concentration is adjusted to become about 5%. Then, the measurement is performed until the number of measured particles reaches 50,000.

(7) The measurement data are analyzed by the above-described dedicated software attached to the apparatus, so that the weight average particle diameter (D4) and the number average particle diameter (D1) are calculated. In this regard, when Graph/% by volume is set in the above-described dedicated software, "Average diameter" on the screen of "Analysis/statistical value on volume (arithmetic average)" is the weight average particle diameter (D4), and when Graph/% by the number is set in the above-described dedicated software, "Average diameter" on the screen of "Analysis/statistical value on the number (arithmetic average)" is the number average particle diameter (D1).

The toner according to the present invention can contain at least one type of wax. The total amount of waxes contained in the toner is preferably 2.5 parts by mass or more and 25.0 parts by mass or less relative to 100 parts by mass of the toner particles. The total amount of waxes contained in the toner particles is preferably 4.0 parts by mass or more and 20 parts by mass or less, and further preferably 6.0 parts by mass or more and 18.0 parts by mass or less. In the case where the amount of wax is 2.5 parts by mass or more and 25.0 parts by mass or less, an appropriate bleeding property of wax is ensured during heating and pressurizing of the toner, so that winding resistance is improved. Furthermore, even when the toner undergoes a stress during development or transfer, exposure of wax at the toner surface is at a low level and individual toner particles obtain nearly uniform triboelectric chargeability. Examples of waxes include the following: aliphatic hydrocarbon based waxes, e.g., low-molecular weight polyethylene, low-molecular weight polypropylene, microcrystalline waxes, Fischer-Tropsch waxes, and paraffin waxes; oxides of aliphatic hydrocarbon based waxes, e.g., oxidized polyethylene wax, or block copolymers thereof; waxes containing a fatty acid ester as a primary component, e.g., carnauba wax and montanic acid ester wax, and waxes produced by partly or wholly deacidifying fatty acid esters, e.g., deacidified carnauba wax; saturated straight chain fatty acids, e.g., palmitic acid, stearic acid, and montanic acid; unsaturated fatty acids, e.g., brassidic acid, eleostearic acid, and parinaric acid; saturated alcohols, e.g., stearyl alcohol, aralkyl alcohol, behenyl alcohol, carnaubyl alcohol, ceryl alcohol, and melissyl alcohol; polyhydric alcohols, e.g., sorbitol; fatty acid amides, e.g., linolamide, oleamide, and lauramide; saturated fatty acid bis-amides, e.g., methylene-bis-stearamide, ethylene-bis-capramide, ethylene-bis-lauramide, and hexamethylene-bis-stearamide; unsaturated fatty acid amides, e.g., ethylene-bis-oleamide, hexamethylene-bis-oleamide, N,N'-dioleyl adipamide, and N,N'-dioleyl sebacamide; aromatic bisamides, e.g., m-xylene-bis-stearamide, and N,N'-distearyl isophthalamide; aliphatic metal salts (those generally referred to as metallic soaps), e.g., calcium stearate, calcium laurate, zinc stearate, and magnesium stearate; waxes which are aliphatic hydrocarbon based waxes grafted by using vinyl based monomers, e.g., styrene and acrylic acid; partly esterified products of fatty acids and polyhydric alcohols, e.g., behenic monoglyceride; and methyl ester compounds which are obtained by hydrogenation of vegetable oils and fats and which have hydroxyl groups.

Examples of binder resins of the toner include the following: polystyrenes; homopolymers of styrene substitution products, e.g., poly-p-chlorostyrene and polyvinyltoluene; styrene based copolymers, e.g., styrene-p-chlorostyrene copolymers, styrene-vinyltoluene copolymers, styrene-vinylnaphthalene copolymers, styrene-acrylic acid ester copolymers, styrene-methacrylic acid ester copolymers, styrene-methyl α-chloromethacrylate copolymers, styrene-acrylonitrile copolymers, styrene-vinyl methyl ether copolymers, styrene-vinyl ethyl ether copolymers, styrene-vinyl methyl ketone copolymers, styrene-butadiene copolymers, styrene-isoprene copolymers, and styrene-acrylonitrile-indene copolymers; acrylic resins; methacrylic resins; polyvinyl acetate; silicone resins; polyester resins; polyamide resins; furan resins; epoxy resins; and xylene resins. These resins may be used alone or in combination.

The toner particles used in the present invention may be produced by using a known pulverization method or polymerization method. In particular, the polymerization method can be employed because toner particles which are close to a sphere and which have surfaces with a low level of unevenness are obtained as compared with the pulverization method and, thereby the effect of giving the transferability is exerted by the silica particles synergetically. Among the polymerization methods, in particular, toner particles can be obtained by a suspension polymerization method.

The method for producing toner particles by the suspension polymerization method will be described below. A polymerizable monomer composition containing a polymerizable monomer, a colorant, a wax, other additives as necessary, and the like is dissolved or dispersed with a dispersing machine, e.g., a homogenizer, a ball mill, a colloid mill, or an ultrasonic dispersing machine, so as to be suspended in an aqueous medium containing a dispersion stabilizer. A polymerization initiator is used and the polymerizable monomer in the polymerizable monomer composition is polymerized, so as to produce toner particles. The polymerization initiator may be added at the same time as addition of the other additives to the polymerizable monomer, or be mixed just before the polymerizable monomer composition is suspended in the aqueous medium. Alternatively, the polymerization initiator dissolved into the polymerizable monomer or the solvent may be added just after granulation is completed and before the polymerization reaction is initiated.

As for the polymerizable monomer, a vinyl based polymerizable monomer capable of being radically polymerized is used. As for the vinyl based polymerizable monomer, a monofunctional monomer or a polyfunctional monomer may be used. Examples of monofunctional polymerizable monomers include the following: styrene; styrene derivatives, e.g., α-methyl styrene, β-methyl styrene, o-methyl styrene, m-methyl styrene, p-methyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-methoxy styrene, and p-phenyl styrene; acrylic polymerizable monomers, e.g., methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxy ethyl acrylate; methacrylic polymerizable monomers, e.g., methyl methacrylate, ethyl methacrylate, n-propyl methacrylate, isopropyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate; methylene aliphatic monocarboxylic acid ester; vinyl esters, e.g., vinyl acetate, vinyl propionate, vinyl butyrate, vinyl benzoate, and vinyl formate; vinyl ethers, e.g., vinyl methyl ether, vinyl ethyl ether, and vinyl isobutyl ether; and vinyl ketones, e.g., vinyl methyl ketone, vinyl hexyl ketone, and vinyl isopropyl ketone.

Examples of polyfunctional polymerizable monomers include the following: diethylene glycol diacrylate, triethylene glycol diacrylate, tetraethylene glycol diacrylate, polyethylene glycol diacrylate, 1,6-hexane diol diacrylate, neopentyl glycol diacrylate, tripropylene glycol diacrylate, polypropylene glycol diacrylate, 2,2'-bis(4-(acryloxy•diethoxy)phenyl)propane, trimethylolpropane triacrylate, tetramethylolmethane tetraacrylate, ethylene glycol dimethacrylate, diethylene glycol dimethacrylate, triethylene glycol dimethacrylate, tetraethylene glycol dimethacrylate, polyethylene glycol dimethacrylate, 1,3-butylene glycol dimethacrylate, 1,6-hexane diol dimethacrylate, neopentyl glycol dimethacrylate, polypropylene glycol dimethacrylate, 2,2'-bis(4-(methacryloxy•diethoxy)phenyl) propane, 2,2'-bis(4-(methacryloxy•polyethoxy)phenyl)propane, trimethylolpropane trimethacrylate, tetramethylolmethane tetramethacrylate, divinylbenzene, divinylnaphthalene, and divinyl ether.

The monofunctional polymerizable monomers are used alone, in combination of at least two types, or in combination with the polyfunctional polymerizable monomers. The polyfunctional polymerizable monomer may also be used as a cross-linking agent.

As for the polymerization initiator used in polymerization of the polymerizable monomer, oil-soluble initiators and/or water-soluble initiators are used. Examples of oil-soluble initiators include the following: azo compounds, e.g., 2,2'-azobisisobutyronitrile, 2,2'-azobis-2,4-dimethylvaleronitrile, 1,1'-azobis(cyclohexane-1-carbonitrile), and 2,2'-azobis-4-methoxy-2,4-dimethylvaleronitrile; and peroxide based initiators, e.g., acetylcyclohexylsulfonyl peroxide, diisopropyl peroxycarbonate, decanonyl peroxide, lauroyl peroxide, stearoyl peroxide, propionyl peroxide, acetyl peroxide, t-butyl peroxy-2-ethylhexanoate, benzoyl peroxide, t-butyl peroxyisobutyrate, cyclohexanone peroxide, methyl ethyl ketone peroxide, dicumyl peroxide, t-butyl hydroperoxide, di-t-butyl peroxide, and cumene hydroperoxide. Examples of water-soluble initiators include the following: ammonium persulfate, potassium persulfate, 2,2'-azobis(N,N'-dimethylene isobutyl amidine) hydrochloride, 2,2'-azobis(2-aminodinopropane) hydrochloride, azobis(isobutyl amidine) hydrochloride, sodium 2,2'-azobisisobutyronitrile sulfonate, ferrous sulfate, and hydrogen peroxide. Furthermore, a chain transfer agent, a polymerization inhibitor, and the like may be used in order to control the degree of polymerization of the polymerizable monomer.

As for the cross-linking agent, a compound having at least two polymerizable double bonds is used. Specific examples thereof include aromatic divinyl compounds; e.g., divinylbenzene and divinylnaphthalene; carboxylic acid esters having two double bonds, e.g., ethylene glycol diacrylate, ethylene glycol dimethacrylate, and 1,3-butane diol dimethacrylate; divinyl compounds, e.g., divinylaniline, divinyl ether, divinyl sulfide, and divinyl sulfone; and compounds having at least three vinyl groups. They are used alone or as a mixture.

As for the colorant, black, yellow, magenta, and cyan colorants, described below, may be used.

As for the black colorant, carbon black and magnetic substances may be used. Furthermore, a color and a toner resistance may be adjusted by mixing the following coloring materials.

As for pigment based yellow colorants, compounds typified by condensed azo compounds, isoindolinone compounds, anthraquinone compounds, azo metal complex methine compounds, and allylamide compounds are used. Specific examples include C.I. Pigment Yellow 3, 7, 10, 12, 13, 14, 15, 17, 23, 24, 60, 62, 74, 75, 83, 93, 94, 95, 99, 100, 101, 104, 108, 109, 110, 111, 117, 123, 128, 129, 138, 139, 147, 148, 150, 155, 166, 168, 169, 177, 179, 180, 181, 183, 185, 191:1, 191, 192, 193, and 199. Examples of die based yellow colorants include C.I. solvent Yellow 33, 56, 79, 82, 93, 112, 162, and 163, and C.I. disperse Yellow 42, 64, 201, and 211.

As for magenta colorants, condensed azo compounds, diketopyrrolopyrrole compounds, anthraquinone, quinacridone compounds, basic dye lake compounds, naphthol compounds, benzimidazolone compounds, thioindigo compounds, and perylene compounds are used. Specific examples include C.I. Pigment Red 2, 3, 5, 6, 7, 23, 48:2, 48:3, 48:4, 57:1, 81:1, 122, 146, 166, 169, 177, 184, 185, 202, 206, 220, 221, 238, 254, and 269 and C.I. Pigment Violet 19.

As for cyan colorants, phthalocyanine compounds and derivatives thereof, anthraquinone compounds, and basic dye lake compounds are used. Specific examples include C.I. Pigment Blue 1, 7, 15, 15:1, 15:2, 15:3, 15:4, 60, 62, and 66.

These colorants may be used alone or in combination. Furthermore, the colorant may be used in the state of solid solution. The colorant is selected from the viewpoint of the hue angle, the saturation, the brightness, the weather resistance, the OHP transparency, and dispersibility into the toner. The amount of addition of the colorant is preferably 1 part by mass or more and 20 parts by mass or less relative to 100 parts by mass of binder resin.

In order to keep the stable chargeability of the toner, a charge control agent can be applied to the toner. Examples of negative charge control agents include the following: monoazo metal compounds; acetylacetone metal compounds; aromatic oxycarboxylic acids, aromatic dicarboxylic acids, oxycarboxylic acids, dicarboxylic acids, and metal compounds, anhydrides, and ester compounds of these acids; phenol derivatives, e.g., bisphenol; urea derivatives; metal-containing salicylic acid based compounds; metal-containing naphthoic acid based compounds; boron compounds; quaternary ammonium salts; calixarenes; and resin based charge control agents. Examples of positive charge control agents include the following: nigrosine-modified compounds on the basis of nigrosine, fatty acid metal salts, and the like; guanidine compounds, imidazole compounds, tributylbenzylammonium-1-hydroxy-4-naphthosulfonate, quaternary ammonium salts, e.g., tetrabutylammonium tetrafluoroborate, onium salts which are analogues thereof, e.g., phosphonium salts, and lake pigments thereof; triphenylmethane dyes and lake pigments thereof (examples of laking agents include phosphotungstic acid, phosphomolybdic acid, phosphotungsten molybdic acid, tannic acid, lauric acid, gallic acid, ferricyanides, and ferrocyanides); metal salts of higher fatty acids;

diorganotin oxides, e.g., dibutyltin oxide, dioctyltin oxide, and dicyclohexyltin oxide; diorganotin borates, e.g., dibutyltin borate, dioctyltin borate, and dicyclohexyltin borate; and resin based charge control agents. They may be used alone or in combination.

Most of all, salicylic acid based metal compounds can be used as the charge control agent, and furthermore, aluminum or zirconium can be employed as the metal thereof. In particular, aluminum salicylate compounds can be used as the charge control agent. The content of the charge control agent is preferably 0.01 parts by mass or more and 20.00 parts by mass or less relative to 100 parts by mass of binder resin, and more preferably 0.50 parts by mass or more and 10.00 parts by mass or less.

Besides the above described silica particles, other inorganic fine powders can be externally added in order to improve the charge stability, developability, the fluidity, the transferability, and the like. Examples of other fine particles include metal oxides, e.g., silica, alumina, and titania, and compound oxides thereof and fluorocarbon. At least two types of them may be used in combination. In particular, silica, alumina, titania, and compound oxides thereof can be used because the fluidity and the chargeability of the toner are maintained favorably and adsorption performance with respect to toner particles is high.

The inorganic fine powder used besides the above described silica particles has an average primary particle diameter of preferably 5 nm or more and 70 nm or less. In the case where the average primary particle diameter of the inorganic fine powder is within the above described range, good fluidity and chargeability of the toner can be maintained over a long term.

Method for Measuring Average Primary Particle Diameter Of Inorganic Fine Powder

Regarding the average primary particle diameter of the inorganic fine powder, the inorganic fine powder is observed with a transmission electron microscope, and in a field of view magnified by 30,000 to 50,000 times, an average value of major axes of 300 primary particles having major axes of 1 nm or more is calculated. In this regard, in the case where sampled particles are small in such a way that the particle diameter cannot be measured under a magnification of 50,000 times, the photograph is further magnified in such a way that the primary diameters become 5 mm or more, and the measurement is performed.

The inorganic fine powder can be subjected to a hydrophobizing treatment. The hydrophobizing treatment method and the hydrophobizing agent are the same as those in the case where the above described silica particles are subjected to the hydrophobizing treatment.

The total amount of the silica particles and the inorganic fine powder added to the toner is preferably 0.5 parts by mass or more and 4.5 parts by mass or less, and more preferably 0.8 parts by mass or more and 3.5 parts by mass or less relative to 100 parts by mass of toner particles. In the case where the total amount of the silica particles and the inorganic fine powder is within the above described range, the fluidity of the toner is obtained sufficiently, degradation in fogging and toner scattering associated with reduction in chargeability of the toner can be prevented.

Known external additives, e.g., charge control particles, an abrasive, and a caking inhibitor, may be used besides the inorganic fine powder. Examples of charge control particles include metal oxides (tin oxide, titania, zinc oxide, alumina, antimony oxide, and the like) and carbon black. Examples of abrasives include metal oxides (strontium titanate, cerium oxide, aluminum oxide, magnesium oxide, chromium oxide, and the like), nitrides (silicon nitride and the like), carbides (silicon carbide and the like), and meal salts (calcium sulfate, barium sulfate, calcium carbonate, and the like).

Furthermore, a lubricant may also be used in order to reduce contamination of the members. Examples of lubricants include fluorine based resin powders (polyvinylidene fluoride, polytetrafluoroethylene, and the like) and fatty acid metal salts (zinc stearate, calcium stearate, and the like). Among those described above, zinc stearate can be used. The amount of addition of these charge control particles, abrasive, caking inhibitor, and the like (excluding the silica particles and the above described inorganic fine powder) is preferably 0.01 parts by mass or more and 2.50 parts by mass or less, and more preferably 0.10 parts by mass or more and 2.00 parts by mass or less relative to 100 parts by mass of toner particles.

The toner according to the present invention may be used for any one of a high-speed system, oilless fixing, a cleaner-less system, and a developing system in which carriers degraded through a long term of use in a developing device are recovered sequentially and fresh carriers are supplied. Moreover, the toner can be applied to known image forming methods by using a one-component developing system or a two-component developing system. In particular, the toner according to the present invention has very good transferability and, therefore, can be used in an image forming method including an intermediate transfer body and an image forming method including a cleaner-less system regardless of the one-component developing system or the two-component developing system.

The toner according to the present invention may be used as a two-component system developing agent with respect to either full color or monochrome.

EXAMPLES

Production Example of Silica Particles 1

A 3-liter glass reactor provided with an agitator, a dropping funnel, and a thermometer was charged with 589.6 g of methanol, 42.0 g of water, and 47.1 g of 28% by mass ammonia water, followed by mixing. The resulting solution was adjusted to become 35° C., and addition of 1,100.0 g (7.23 mol) of tetramethoxysilane and 395.2 g of 5.4% by mass ammonia water was started at the same time under agitation. Tetramethoxysilane was dropped over 6 hours and ammonia water was dropped over 5 hours. After the dropping was completed, agitation was continued for further 0.5 hours to effect hydrolysis, so that a methanol-water dispersion liquid of hydrophilic spherical sol-gel silica fine particles was obtained. Subsequently, an ester adaptor and a cooling tube were attached to the glass reactor and the above described dispersion liquid was dried at 80° C. under reduced pressure sufficiently. The resulting silica particles were heated in a constant temperature bath at 400° C. for 10 minutes.

The above described step was performed several tens of times, and the resulting silica particles were subjected to a disintegration treatment with Pulverizer (produced by Hosokawa Micron Corporation).

Thereafter, 500 g of silica particles were charged into a polytetrafluoroethylene internal cylinder type stainless steel autoclave having an internal volume of 1,000 ml. The inside of the autoclave was substituted with nitrogen and, then, 0.5 g of hexamethyldisilazane (HMDS) and 0.1 g of water made into a fog with a two-fluid nozzle were blown on the silica particles uniformly while an agitation blade attached to the autoclave was rotated at 400 rpm. After agitation was performed for 30 minutes, the autoclave was sealed and heated at 200° C. for 2 hours. Subsequently, the inside of the system was decompressed while heating was continued, so that a deammoniation treatment was performed to obtain Silica particles 1. The properties of Silica particles 1 are shown in Table 1.

Production Examples of Silica Particles 2 to 4

Regarding the production example of Silica particles 1, the amount of methanol used at an initial stage was changed to 530.6 g, 634.0 g, and 737.3 g, respectively. Furthermore, the dropping time of tetramethoxysilane was changed to 7 hours, 6 hours, and 5 hours, respectively, and the dropping time of the 5.4% by mass ammonia water was changed to 6 hours, 5 hours, and 4 hours, respectively. The volume average particle diameter (Dv) of the silica particles and the variation coefficient of diameters of the silica particles, based on volume distribution thereof, were adjusted by the above described operation. Moreover, in the surface treatment with HMDS, the amounts of HMDS and water were adjusted in such a way that the amount of carbon became the same as the amount of Silica particles 1 and, thereby, Silica particles 2 to 4 were obtained. The properties of Silica particles 2 to 4 are shown in Table 1.

Production Examples of Silica Particles 5 to 7

Regarding the production example of Silica particles 1, the amount of methanol used at an initial stage was changed to 491.3 g, 360.1 g, and 294.8 g, respectively. Furthermore, the dropping time of tetramethoxysilane was changed to 7 hours, 5.5 hours, and 5 hours, respectively, and the dropping time of the 5.4% by mass ammonia water was changed to 6 hours, 4.5 hours, and 4 hours, respectively. The volume average particle diameter (Dv) of the silica particles and the variation coefficient of diameters of the silica particles, based on volume distribution thereof, were adjusted by the above described operation. Moreover, in the surface treatment with HMDS, the amounts of HMDS and water were adjusted in such a way that the amount of carbon became the same as the amount of Silica particles 1 and, thereby, Silica particles 5 to 7 were obtained. The properties of Silica particles 5 to 7 are shown in Table 1.

Production Examples of Silica Particles 8 to 11

Regarding the production example of Silica particles 1, the dropping time of tetramethoxysilane was changed to 6 hours, 5 hours, 3.5 hours, and 2 hours, respectively, and the dropping time of the 5.4% by mass ammonia water was changed to 5 hours, 4 hours, 3 hours, and 2 hours, respectively. The volume average particle diameter (Dv) of the silica particles and the variation coefficient of diameters of the silica particles, based on volume distribution thereof, were adjusted by the above described operation. Moreover, in the surface treatment with HMDS, the amounts of HMDS and water were adjusted in such a way that the amount of carbon became the same as the amount of Silica particles 1 and, thereby, Silica particles 8 to 11 were obtained. The properties of Silica particles 8 to 11 are shown in Table 1.

Production Examples of Silica Particles 12 to 15

Regarding the production example of Silica particles 1, the time of heating in the constant temperature bath at 400° C. was changed to 9 minutes, 8 minutes, 3.2 minutes, and 1.4 minutes, respectively. The ratio of mass decrease when heating from 105° C. to 200° C. was performed was adjusted and, thereby, Silica particles 12 to 15 were obtained. The properties of Silica particles 12 to 15 are shown in Table 1.

Production Example of Silica Particles 16

Silica particles (fumed silica) having a volume average particle diameter (Dv) of 92 nm were produced by a combustion method. The variation coefficient of diameters of the silica particles, based on volume distribution thereof, was 35%. The particles were classified and, thereby, silica particles having a volume average particle diameter (Dv) of 85 nm and a variation coefficient of diameters of particles, based on volume distribution thereof, of 21% were obtained. The particles were surface-treated with HMDS in the same manner as that for Silica particles 1, so as to obtain Silica particles 16. The properties of Silica particles 16 are shown in Table 1.

Production Example of Silica Particles 17

Silica particles having a volume average particle diameter (Dv) of 150 nm ware produced from metal silicon serving as a raw material through deflagration on the basis of the method described in Japanese Patent Laid-Open No. 60-255602. The variation coefficient of diameters of the silica particles, based on volume distribution thereof, was 30%. The particles were classified and, thereby, silica particles having a volume average particle diameter (Dv) of 120 nm and a variation coefficient of diameters of particles, based on volume distribution thereof, of 21% were obtained. The particles were surface-treated with HMDS in the same manner as that for Silica particles 1, so as to obtain Silica particles 17. The properties of Silica particles 17 are shown in Table 1.

Production Examples of Silica Particles 18 and 19

Regarding the production example of Silica particles 1, the heating temperature in the surface treatment with HMDS was adjusted in such a way that the fixing ratio became 90% and 86%, respectively, so as to obtain Silica particles 18 and 19. The properties of Silica particles 18 and 19 are shown in Table 1.

Production Example of Silica Particles 20

Regarding the production example of Silica particles 1, the amounts of HMDS and water in the surface treatment with HMDS were changed to 0.80 g and 0.15 g, respectively, so as to obtain Silica particles 20. The properties of Silica particles 20 are shown in Table 1.

Production Example of Silica Particles 21

Regarding the production example of Silica particles 1, the amounts of HMDS and water in the surface treatment with HMDS were changed to 10.00 g and 1.50 g, respectively, so as to obtain Silica particles 21. The properties of Silica particles 21 are shown in Table 1.

Production Example of Silica Particles 22

Regarding the production example of Silica particles 1, the amounts of HMDS and water in the surface treatment with HMDS were changed to 50.00 g and 7.50 g, respectively, so as to obtain Silica particles 22. The properties of Silica particles 22 are shown in Table 1.

Production Example of Silica Particles 23

Regarding the production example of Silica particles 1, the amounts of HMDS and water in the surface treatment with HMDS were changed to 65.00 g and 9.50 g, respectively, so as to obtain Silica particles 23. The properties of Silica particles 23 are shown in Table 1.

Production Example of Silica Particles 24

Regarding the production example of Silica particles 1, the surface treatment with HMDS was not performed and the time of heating in the constant temperature bath at 400° C. was changed to 15 minutes. Silica particles 24 were obtained as in the production example of Silica particles 1 except those described above. The properties of Silica particles 24 are shown in Table 1.

TABLE 1

| Silica particles | Volume average particle diameter (nm) | Variation coefficient of diameter of particles, based on volume distribution (%) | Ratio of mass decrease (%) | Production method | Fixing ratio of hydrophobizing agent (%) | Amount of carbon (% by mass) |
|---|---|---|---|---|---|---|
| Silica particles 1 | 100 | 9 | 0.01 | sol-gel method | 95 | 0.05 |
| Silica particles 2 | 80 | 9 | 0.01 | sol-gel method | 94 | 0.05 |
| Silica particles 3 | 70 | 10 | 0.01 | sol-gel method | 93 | 0.05 |
| Silica particles 4 | 60 | 18 | 0.01 | sol-gel method | 94 | 0.05 |
| Silica particles 5 | 200 | 9 | 0.01 | sol-gel method | 95 | 0.05 |
| Silica particles 6 | 500 | 13 | 0.01 | sol-gel method | 93 | 0.05 |
| Silica particles 7 | 600 | 21 | 0.01 | sol-gel method | 92 | 0.05 |
| Silica particles 8 | 100 | 10 | 0.01 | sol-gel method | 94 | 0.05 |
| Silica particles 9 | 190 | 15 | 0.01 | sol-gel method | 95 | 0.05 |
| Silica particles 10 | 200 | 23 | 0.01 | sol-gel method | 95 | 0.05 |
| Silica particles 11 | 200 | 27 | 0.01 | sol-gel method | 92 | 0.05 |
| Silica particles 12 | 100 | 9 | 0.02 | sol-gel method | 91 | 0.05 |
| Silica particles 13 | 100 | 9 | 0.10 | sol-gel method | 93 | 0.05 |
| Silica particles 14 | 100 | 9 | 0.60 | sol-gel method | 95 | 0.05 |
| Silica particles 15 | 100 | 9 | 0.90 | sol-gel method | 94 | 0.05 |
| Silica particles 16 | 85 | 21 | 0.14 | fuming method | 91 | 0.05 |
| Silica particles 17 | 120 | 21 | 0.06 | deflagration method | 91 | 0.05 |
| Silica particles 18 | 100 | 9 | 0.01 | sol-gel method | 90 | 0.05 |
| Silica particles 19 | 100 | 9 | 0.01 | sol-gel method | 86 | 0.05 |
| Silica particles 20 | 100 | 9 | 0.01 | sol-gel method | 93 | 0.08 |
| Silica particles 21 | 100 | 9 | 0.01 | sol-gel method | 91 | 1.0 |
| Silica particles 22 | 100 | 9 | 0.01 | sol-gel method | 91 | 4.5 |
| Silica particles 23 | 100 | 9 | 0.01 | sol-gel method | 90 | 6.2 |
| Silica particles 24 | 100 | 9 | 0 | sol-gel method | untreated | — |

Production Example of Charge Control Resin 1

A pressurizable reaction container provided with a reflux tube, an agitator, a thermometer, a nitrogen introduction tube, a dropping device, and a decompression device is charged with 250 parts by mass of methanol, 150 parts by mass of 2-butanone, and 100 parts by mass of 2-propanol, which are solvents, and 77 parts by mass of styrene, 15 parts by mass of 2-ethylhexyl acrylate, and 8 parts by mass of 2-acrylamide-2-methylpropane sulfonic acid, which are monomers, and was heated to a reflux temperature under agitation. A solution, in which 1 part by mass of t-butylperoxy-2-ethylhexanoate serving as a polymerization initiator was diluted with 20 parts by mass of 2-butanone, was dropped over 30 minutes and agitation was continued for 5 hours. Furthermore, the solution, in which 1 part by mass of t-butylperoxy-2-ethylhexanoate was diluted with 20 parts by mass of 2-butanone, was dropped over 30 minutes, agitation was performed for 5 hours, and polymerization was terminated. While the temperature was maintained, 500 parts by mass of deionized water was added, and agitation was performed at 80 to 100 revolutions per minute for 2 hours in such a way that the interface between an organic layer and a water layer was not disturbed. After the layers were separated by being stood for 30 minutes, the water layer was removed, and anhydrous sodium sulfate was added to the organic layer, so as to dehydrate. Subsequently, the polymerization solvents were removed through distillation under reduced pressure, and the resulting polymer was coarsely pulverized into 100 μm or less by using a cutter mill equipped with a 150 mesh screen. The resulting Charge control resin 1 containing a sulfur atom had Tg of 58° C., Mp of 13,000, and Mw of 30,000.

Production Example of Toner Particles 1

With respect to 100 parts by mass of styrene monomer, 16.5 parts by mass of C.I. Pigment Blue 15:3 and 3.0 parts by mass of aluminum compound of di-tert-butylsalicylic acid (Bontron E-88 produced by Orient Chemical Industries, Ltd.) were prepared. They were introduced into an attritor (produced by MITSUI MINING COMPANY, LIMITED), and agitation was performed at 25° C. for 180 minutes by using zirconia beads having a radius of 1.25 mm (140 parts by mass) at 200 rpm, so that Master batch dispersion liquid 1 was prepared.

Meanwhile, 450 parts by mass of 0.1 M-Na$_3$PO$_4$ aqueous solution was put into 710 parts by mass of ion-exchanged water, the temperature was raised to 60° C., and 67.7 parts by mass of 1.0 M-CaCl$_2$ aqueous solution was added gradually, so that an aqueous medium containing a calcium phosphate compound was obtained.

| | |
|---|---|
| Master batch dispersion liquid 1 | 40 parts by mass |
| Styrene monomer | 28 parts by mass |
| n-Butyl acrylate monomer | 18 parts by mass |
| Low-molecular weight polystyrene (Mw = 3,000, Mn = 1,050, Tg = 55° C.) | 20 parts by mass |
| Hydrocarbon based wax (Fischer-Tropsch wax, peak temperature of maximum endothermic peak = 78° C., Mw = 750) | 9 parts by mass |
| Charge control resin 1 | 0.3 parts by mass |
| Polyester resin | 5 parts by mass |

(Polycondensate of terephthalic acid:isophthalic acid: propylene oxide-modified bisphenol A (2 mol adduct):ethylene oxide-modified bisphenol A (2 mol adduct)=30:30:30:10, acid value 11 mgKOH/g, Tg=74° C., Mw=11,000, Mn=4,000)

The above described materials were heated to 65° C., and were dissolved and dispersed homogeneously with TK type Homomixer (produced by Tokushu Kika Kogyou Co., Ltd.) at 5,000 rpm. A polymerizable monomer composition was prepared by dissolving 7.1 parts by mass of 70% toluene solution of 1,1,3,3-tetramethylbutylperoxy-2-ethylhexanoate serving as a polymerization initiator into the dispersion liquid.

The above described polymerizable monomer composition was put into the above described aqueous medium, and agitation was performed at a temperature of 65° C. for 10 minutes in a N$_2$ atmosphere with TK type Homomixer at 10,000 rpm, so as to granulate the polymerizable monomer composition. Thereafter, the temperature was raised to 67° C. while agitation was performed with a paddle agitation blade, and when the degree of polymerization conversion of the polymerizable vinyl based monomer reached 90%, 0.1 mol/l sodium hydroxide aqueous solution was added to adjust the pH of the aqueous dispersion medium to 9. Furthermore, the temperature was raised to 80° C. at a temperature increase rate of 40° C./h and the reaction was effected for 4 hours. After the polymerization was terminated, remaining monomers of toner particles for supply were removed through distillation under reduced pressure. The aqueous medium was cooled and, subsequently, hydrochloric acid was added to adjust the pH to 1.4, and calcium phosphate was dissolved by performing agitation for 6 hours. Toner particles were separated through filtration and were washed with water. Then, drying was performed at a temperature of 40° C. for 48 hours. Regarding the resulting dried product, ultrafine powders and coarse powders were precisely classified and removed with a multi-division classifier (Elbow-Jet Classifier produced by Nittetsu Mining Co., Ltd.) at the same time, so that cyan Toner particles 1 having a weight average particle diameter (D4) of 6.3 μm was obtained.

Example 1

Toner 1 was obtained by dry-mixing 1.5 parts by mass of Silica particles 1 and 0.2 parts by mass of rutile-type titanium dioxide fine powder surface-treated with dimethyl silicone oil (average primary particle diameter: 30 nm) relative to 100 parts by mass of Toner particles 1 for 5 minutes with Henschel mixer (produced by MITSUI MINING COMPANY, LIMITED). Then, Toner 1 was evaluated as described below. The evaluation results are shown in Table 2.

Image Output Test

A printer LBP-7200C produced by CANON KABUSHIKI KAISHA was used, and images were evaluated in various environments. In this regard, LBP 7200C is a system which does not have a cleaning member in an intermediate transfer unit portion and which recovers remaining toners of primary and secondary transfer with a cleaning member in a photo conductor unit. A cartridge filled with 70 g of Toner 1 was mounted on the cyan station of the above described printer, dummy cartridges were mounted on other stations, and an image output test was performed.

Images were evaluated in each of environments of 15° C./10% Rh (low-temperature low-humidity environment) and 32.5° C./90% Rh (high-temperature high-humidity environment). In each environment, an operation to output an image with a coverage of 1% was repeated, and every time the number of the output sheets reached 200, standing was performed for a week in each environment. Thereafter, the step to output 200 sheets in the above described manner was repeated, and finally 4,600 sheets were output. Then, an evaluation was performed by a method as described below.

(1) Evaluation of Fogging

In the above described image output test, every time after standing for a week, one sheet of image having a white background portion was output. Subsequently, regarding every image having a white background portion, the fogging concentration (%) (=Dr (%)−Ds (%)) was calculated from the difference between the degree of whiteness (reflectance Ds (%)) of the white background portion of the image having a white background portion and the degree of whiteness (average reflectance Dr (%)) of transfer paper. In this regard, the degree of whiteness was measured with "REFLECTMETER MODEL TC-6DS" (produced by Tokyo Denshoku Co., Ltd.). As for the filter, the Amberlite filter was used. The fogging concentrations were ranked as described below. A, B, and C are acceptable levels in the present invention.

A: The fogging concentration is less than 0.3%.
B: The fogging concentration is 0.3% or more and less than 0.8%.
C: The fogging concentration is 0.8% or more and less than 1.3%.
D: The fogging concentration is 1.3% or more.

(2) Stability of Image Density

The image density was measured with a color reflection densitometer (X-RITE 404 produced by X-Rite). In the above described image output test, every time after standing for about one week, one sheet of solid image was output, and the density of each image was measured. Among the resulting image densities, the difference between the maximum density and the minimum density was determined and was evaluated on the basis of the criteria described below.

A: The image density difference is 0.1 or less.
B: The image density difference is more than 0.1 and 0.3 or less.
C: The image density difference is more than 0.3 and 0.5 or less.
D: The image density difference is more than 0.5.

(3) Thin Line Reproducibility

The thin line reproducibility was evaluated from the viewpoint of image quality. In the above described image output test, after 4,600 sheets of images were output, an image in which a lattice pattern with a line width of 3 pixels was drawn all over an A4 paper (coverage of 4% on a volume basis) was printed, and the thin line reproducibility was evaluated on the basis of the criteria described below. The line width of 3 pixels are 127 μm theoretically. The line width of the image was measured with Microscope VK-8500 (produced by KEYENCE CORPORATION). The line widths at 5 points selected at random were measured, the maximum value and the minimum value were excluded, and when an average value of the remaining 3 points was represented by d (μm), the thin line reproducibility index L was defined as described below.

$$L(\mu m)=|127-d|$$

The thin line reproducibility index L is defined as the difference between the theoretical line width of 127 μm and the line width d in the output image. The absolute value of the difference is employed in the definition because d may be larger than 127 or be smaller than 127. Smaller L indicates that the thin line reproducibility is excellent.

A: L is 0 μm or more and less than 5 μm (thin line reproducibility is excellent).
B: L is 5 μm or more and less than 15 μm, and slight variations in the width of thin line are observed (thin line reproducibility is good).
C: L is 15 μm or more and less than 30 μm, and thinning and scattering of thin line are conspicuous.
D: L is 30 μm or more and breakage or thickening of thin line is observed in places (thin line reproducibility is poor).

Examples 2 and 3, Comparative Example 1

Toners 2 to 4 were produced as in Example 1 except that Silica particles 1 was changed to Silica particles 2 to 4, respectively, in Example 1. Then, Toners 2 to 4 were evaluated as in Example 1. The results of evaluation are shown in Table 2. As is clear from the results, regarding Comparative example 1, the stability of image density and the thin line reproducibility (image quality) were degraded. The reason for this is estimated that the volume average particle diameter (Dv) of the silica particles was too small and, thereby, the silica particles were not able to exert the effect as the spacer particles on the toner surfaces, so as to degrade the transferability.

Examples 4 and 5, Comparative Example 2

Toners 5 to 7 were produced as in Example 1 except that Silica particles 1 was changed to Silica particles 5 to 7, respectively, in Example 1. Then, Toners 5 to 7 were evaluated as in Example 1. The results of evaluation are shown in Table 2. As is clear from the results, regarding Comparative example 2, all items were degraded in evaluation. The reason for this is estimated that the volume average particle diameter (Dv) of the silica particles was too large and, thereby, the silica particles were eliminated from the toner particle surfaces easily in a long term of use, and stable chargeability and fluidity were not given to the toner continuously.

Examples 6 to 8, Comparative Example 3

Toners 8 to 11 were produced as in Example 1 except that Silica particles 1 was changed to Silica particles 8 to 11, respectively, in Example 1. Then, Toners 8 to 11 were evaluated as in Example 1. The results of evaluation are shown in Table 2. As is clear from the results, regarding Comparative example 3, in particular the thin line reproducibility (image quality) was degraded. The reason for this is believed to be that there were large variations in size of the silica particles, the individual particles became difficult to function as spacer particles efficiently and, thereby, the transferability was degraded. Furthermore, the reason is estimated that differences among the individual particles occurred in giving the chargeability and the fluidity to the toner, distribution of charge was extended, so as to degrade fogging and the like and, thereby stable chargeability, fluidity, and transferability were not ensured over a long term.

Examples 9 to 11, Comparative Example 4

Toners 12 to 15 were produced as in Example 1 except that Silica particles 1 was changed to Silica particles 12 to 15, respectively, in Example 1. Then, Toners 12 to 15 were evaluated as in Example 1. The results of evaluation are shown in Table 2. As is clear from the results, regarding Comparative example 4, all items were degraded in evaluation with respect to high-temperature and high-humidity. The reason for this is estimated that the ratio of mass decrease of Silica particles 15 was large and, thereby the amount of silanol groups was large, a large amount of water was adsorbed, the degrees of giving of the chargeability and the fluidity to the toner were degraded significantly, and stable developability and transferability were not obtained.

Examples 12 and 13

Toners 16 and 17 were produced as in Example 1 except that Silica particles 1 was changed to Silica particles 16 and 17, respectively, in Example 1. Then, Toners 16 and 17 were evaluated as in Example 1. The results of evaluation are shown in Table 2. As is clear from the results, the thin line reproducibility (image quality) was degraded slightly. The reason for this is believed to be that the silica particles were obtained by a fuming method or a deflagration method, the variation coefficient of diameters of the silica particles, based on volume distribution thereof, is large as compared with the silica particles obtained by a sol-gel method and, thereby, the individual particles became difficult to function as spacer particles efficiently and the transferability was degraded slightly. Furthermore, the reason is estimated that differences among the individual particles occurred slightly in giving the chargeability and the fluidity to the toner and, thereby, distribution of charge was extended, so as to degrade fogging and the like slightly.

Examples 14 and 15

Toners 18 and 19 were produced as in Example 1 except that Silica particles 1 was changed to Silica particles 18 and 19, respectively, in Example 1. Then, Toners 18 and 19 were evaluated as in Example 1. The results of evaluation are shown in Table 2. As is clear from the results, regarding Example 15, fogging and the thin line reproducibility (image quality) were degraded slightly with respect to high-temperature and high-humidity. The reason for this is estimated that the fixing ratio of the hydrophobizing agent of Silica particles 19 was low and, thereby, in a long term of use, the hydrophobizing agent was isolated from the silica particles because of the stress in the developing device, and stable hydrophobicity and fluidity were not obtained.

Examples 16 to 19

Toners 20 to 23 were produced as in Example 1 except that Silica particles 1 was changed to Silica particles 20 to 23, respectively, in Example 1. Then, Toners 20 to 23 were evaluated as in Example 1. The results of evaluation are shown in Table 2. As is clear from the results, regarding Example 19, all items were degraded in evaluation with respect to high-temperature and high-humidity. The reason for this is estimated that the amount of surface treatment of the silica particles with the hydrophobizing agent was large, the degree of giving of the fluidity to the toner was reduced slightly, the start-up of charging of the toner was delayed slightly and, thereby, when the image was output after a long term of standing, fogging and the transferability were degraded slightly.

Example 20

Toner 24 was produced as in Example 1 except that Silica particles 1 was changed to Silica particles 24 in Example 1. Then, Toner 24 was evaluated as in Example 1. The results of evaluation are shown in Table 2. As is clear from the results, good results were obtained.

TABLE 2

| | Toner | Silica particles | Low-temperature low-humidity environment | | | High-temperature high-humidity environment | | |
|---|---|---|---|---|---|---|---|---|
| | | | Fogging (measured value) | Stability of image density (measured value) | Thin line reproducibility (measured value) | Fogging (measured value) | Stability of image density (measured value) | Thin line reproducibility (measured value) |
| Example 1 | Toner 1 | Silica particles 1 | A (0.1) | A (0.1) | A (3) | A (0.1) | A (0.1) | A (3) |
| Example 2 | Toner 2 | Silica particles 2 | A (0.2) | A (0.1) | A (4) | A (0.2) | A (0.1) | A (4) |
| Example 3 | Toner 3 | Silica particles 3 | B (0.5) | B (0.2) | C (18) | B (0.4) | B (0.2) | C (17) |
| Comparative example 1 | Toner 4 | Silica particles 4 | C (1.0) | D (0.7) | D (31) | C (0.7) | D (0.5) | D (30) |
| Example 4 | Toner 5 | Silica particles 5 | A (0.2) | A (0.1) | A (4) | A (0.2) | A (0.1) | A (4) |
| Example 5 | Toner 6 | Silica particles 6 | B (0.8) | C (0.4) | C (19) | B (0.5) | C (0.4) | C (22) |
| Comparative example 2 | Toner 7 | Silica particles 7 | D (1.8) | D (0.6) | D (30) | D (1.5) | D (0.5) | D (32) |
| Example 6 | Toner 8 | Silica particles 8 | A (0.2) | A (0.1) | A (4) | A (0.2) | A (0.1) | A (4) |
| Example 7 | Toner 9 | Silica particles 9 | B (0.4) | B (0.2) | B (8) | B (0.5) | B (0.2) | B (9) |
| Example 8 | Toner 10 | Silica particles 10 | B (0.6) | B (0.3) | C (16) | C (1.0) | B (0.3) | C (18) |
| Comparative example 3 | Toner 11 | Silica particles 11 | C (1.3) | C (0.5) | D (30) | D (1.8) | C (0.4) | D (31) |
| Example 9 | Toner 12 | Silica particles 12 | A (0.2) | A (0.1) | A (4) | A (0.2) | A (0.1) | A (4) |
| Example 10 | Toner 13 | Silica particles 13 | B (0.3) | B 0.3) | B (5) | B (0.4) | B (0.2) | B (7) |
| Example 11 | Toner 14 | Silica particles 14 | B (0.8) | C (0.4) | B (12) | C (0.9) | C (0.4) | B (14) |
| Comparative example 4 | Toner 15 | Silica particles 15 | C (1.2) | D (0.7) | C (29) | D (1.6) | D (0.6) | D (33) |
| Example 12 | Toner 16 | Silica particles 16 | B (0.8) | B (0.3) | C (23) | C (0.9) | B (0.3) | C (27) |
| Example 13 | Toner 17 | Silica particles 17 | B (0.8) | B (0.3) | C (22) | C (0.9) | B (0.3) | C (24) |
| Example 14 | Toner 18 | Silica particles 18 | B (0.4) | B (0.2) | B (7) | B (0.7) | B (0.2) | B (6) |
| Example 15 | Toner 19 | Silica particles 19 | B (0.8) | B (0.3) | C (16) | C (1.0) | B (0.3) | C (23) |
| Example 16 | Toner 20 | Silica particles 20 | A (0.2) | A (0.1) | A (4) | A (0.2) | A (0.1) | A (4) |
| Example 17 | Toner 21 | Silica particles 21 | B (0.3) | B (0.2) | B (6) | B (0.3) | B (0.2) | B (8) |
| Example 18 | Toner 22 | Silica particles 22 | B (0.5) | C (0.4) | B (8) | C (0.8) | B (0.3) | B (12) |
| Example 19 | Toner 23 | Silica particles 23 | B (0.7) | C (0.4) | B (12) | C (1.1) | C (0.4) | C (17) |
| Example 20 | Toner 24 | Silica particles 24 | A (0.2) | A (0.1) | B (5) | A (0.2) | A (0.1) | B (5) |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-251905 filed Nov. 10, 2010, which is hereby incorporated by reference herein in its entirety.

What is claimed is:

1. A process for producing a toner, comprising the following steps of:
   (i) obtaining silica particles which are hydrophilic by sol-gel method,
   (ii) performing heat treatment of the silica particles which are hydrophilic, obtained by the step (i), at 300° C. to 500° C.,
   (iii) performing hydrophobizing treatment of the silica particles obtained by the step (ii), with a hydrophobizing agent, and
   (iv) adding the silica particles obtained by the step (iii), to toner particles.

2. The process according to claim 1,
   wherein,
   each of the toner particles comprises a binder resin and a colorant,
   the silica particles obtained by the step (iii), have a volume average particle diameter (Dv) of 70 nm or more and 500 nm or less,
   the variation coefficient of diameters of the silica particles obtained by the step (iii), based on volume distribution thereof, is 23% or less, and
   when heating the silica particles obtained by the step (iii) to measure the mass variation, the ratio of mass decrease of the silica particles at the temperature in the range of 105° C. to 200° C. is 0.60% or less.

3. The process according to claim 2, wherein the fixing rate of the hydrophobizing agent to the silica particles is 90% or more.

* * * * *